(12) United States Patent
Nielsen

(10) Patent No.: US 6,345,973 B1
(45) Date of Patent: *Feb. 12, 2002

(54) MULTIPLE IN-LINE PARISON CONTROL

(75) Inventor: Gary Nielsen, Chicago, IL (US)

(73) Assignee: Pechiney Emballage Flexible Europe (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/629,473

(22) Filed: Jul. 31, 2000

Related U.S. Application Data

(63) Continuation of application No. 09/193,677, filed on Nov. 17, 1998, now Pat. No. 6,113,841.

(51) Int. Cl.[7] .......................... B29C 49/04; B29C 49/36
(52) U.S. Cl. ....................... 425/145; 425/169; 425/532; 425/540
(58) Field of Search ................................ 425/169, 532, 425/540, 145; 264/540, 542, 543

(56) References Cited

U.S. PATENT DOCUMENTS

| | | | | |
|---|---|---|---|---|
| 3,355,763 A | * | 12/1967 | Willert | 425/540 |
| 3,611,483 A | | 10/1971 | Amsden et al. | 425/532 |
| 3,759,648 A | * | 9/1973 | Hunkar | 425/532 |
| 3,843,305 A | | 10/1974 | Doughty et al. | 425/381 |
| 3,954,370 A | * | 5/1976 | Pollock et al. | 425/540 |
| 3,963,404 A | | 6/1976 | Pollock et al. | 425/540 |
| 3,986,807 A | | 10/1976 | Takegami et al. | 425/532 |
| 4,213,750 A | | 7/1980 | Kubota et al. | 425/540 |
| 4,338,071 A | | 7/1982 | Daubenbüchel et al. | 425/532 |
| 4,470,937 A | | 9/1984 | Sugimoto et al. | 264/40.1 |
| 4,698,012 A | | 10/1987 | Shelby et al. | 425/526 |
| 4,786,245 A | | 11/1988 | Windstrup et al. | 425/541 |
| 4,861,542 A | * | 8/1989 | Oles et al. | 425/532 |
| 4,902,217 A | | 2/1990 | Martin et al. | 425/540 |
| 4,919,607 A | | 4/1990 | Martin et al. | 425/540 |
| 5,229,143 A | | 7/1993 | Ogura et al. | 425/540 |
| 5,244,610 A | | 9/1993 | Kitzmiller | 425/540 |
| 5,433,916 A | | 7/1995 | Budzynski et al. | 264/540 |
| 5,551,860 A | | 9/1996 | Budzynski et al. | 425/532 |
| 5,556,648 A | | 9/1996 | Budzynski et al. | 425/540 |
| 5,562,934 A | | 10/1996 | Langos et al. | 425/532 |
| 5,567,368 A | | 10/1996 | Ando et al. | 264/40.1 |
| 5,645,870 A | | 7/1997 | Larsen | 425/540 |
| 5,698,241 A | | 12/1997 | Kitzmiller | 425/532 |
| 5,705,121 A | | 1/1998 | Allred, Jr. | 264/543 |
| 5,840,349 A | | 11/1998 | Brown, Jr. et al. | 425/532 |
| 6,113,841 A | * | 9/2000 | Nielson | 425/540 |
| 6,139,790 A | | 10/2000 | Bogen et al. | 425/526 |

FOREIGN PATENT DOCUMENTS

| | | |
|---|---|---|
| EP | 0464933 | 1/1992 |
| EP | 0858878 | 8/1998 |
| JP | 07-171882 | 7/1995 |
| JP | 06-305007 | 11/1995 |

OTHER PUBLICATIONS

Patent Abstracts of Japan abstract of JP–04299103 dated Oct. 1992.

\* cited by examiner

*Primary Examiner*—Robert Davis
(74) *Attorney, Agent, or Firm*—McDermott, Will & Emery

(57) ABSTRACT

A blow molding machine comprising a base, a wheel mounted rotationally on the base, a controller to control operation of a pin within a die, and a position detector for detecting a short run mold on the wheel wherein the wheel comprises a plurality of identical molds and the short run mold which differs in size and/or shape from each of the plurality of identical molds. The position detector, upon detecting the short run mold, switches a relay to switch from a first pin control program causing the extrusion of a parison having appropriate parameters for the plurality of identical molds, to a second pin control program causing the extrusion of a parison having appropriate parameters for the short run mold.

40 Claims, 2 Drawing Sheets

MULTIPLE IN-LINE PARISON CONTROL

This application is a continuation application of U.S. patent application Ser. No. 09/193,677 filed Nov. 17, 1998, now U.S. Pat. No. 6,113,841.

FIELD OF THE INVENTION

The present invention relates to plastic blow molding machines.

BACKGROUND OF THE INVENTION

Conventional blow molding apparatus are typically provided with a plurality of identical molds and are capable of in-line production of identical bottles. One type of blow molding apparatus is a wheel type blow molding apparatus comprising a wheel having a plurality of identical molds positioned about the circumference thereof. Each mold typically includes two mold halves each comprising a mold cavity half therein so that when the mold halves are closed the mold defines a mold cavity corresponding to the configuration of the article to be molded, such as a bottle. When employed for extrusion blow molding, the wheel will rotate each mold, seriatim, to an extrusion die positioned adjacent to the wheel. As each mold approaches the die, a parison having predetermined characteristics is extruded from the die and the mold halves of the approaching mold close around, and take hold of, the parison. The wheel then advances the mold and parison to a blowing needle which introduces internal pressure to the parison forcing it to expand to the configuration of the mold cavity and thus forming the desired bottle. The bottle is then cooled and released from the mold.

When exceptionally large production is required, multiple wheel type blow molding apparatus may be employed simultaneously to increase production output. Large production runs allow for continuous wheel operation at full capacity and minimal wheel downtime. Economies of scale and reduced costs per bottle are achieved.

It is occasionally necessary to manufacture only a small production run of identical articles. Short run production jobs, however, are less economically advantageous. The costs associated with such production runs (e.g., creating multiple molds, testing and wheel downtime for mold changeover) are spread over fewer bottles resulting in a per bottle cost which is often prohibitive. Operating a wheel at less than full capacity or using only a few molds on a wheel is possible to accomplish a short run, but such alternatives also increase per unit bottle cost. Accordingly, conventional wheel type blow molding machines are disadvantageous for short run production, ultimately making short run business unattractive.

U.S. Pat. No. 5,556,648 to Budzynski teaches providing each mold of a wheel type blow molding apparatus with a first and second inner cavity wherein the first cavity may be different from the second cavity, allowing for production of two distinct bottle configurations per mold. However, each mold on the wheel of Budzynski is identical to each of the others. Thus, the same number of bottles of each configuration will always be produced by the Budzynski apparatus and short run orders can not therefore be accommodated without replacing each mold on the wheel or operating the wheel at less than full capacity. Indeed, the resulting production of a wheel employing these molds would be identical to simultaneously running two wheels, each comprising a different set of identical molds.

Accordingly, there is a need for an improved method and apparatus for blow molding plastic articles for producing a short run of an article without significant downtime for testing and mold changeovers. There is also a related need for an improved method and apparatus for blow molding which reduces the costs associated with short run production jobs.

SUMMARY OF THE INVENTION

It is an object of the present invention to provide a wheel type blow molding machine having a plurality of identical in-line molds and at least one short run mold in line with, and differing in configuration from, the plurality of identical in-line molds.

It is a further object of the invention to provide a position detector for detecting the proximity of a short run in-line mold to a parison supply.

It is a further object of the invention to provide a controller causing a parison supply to provide a first parison configured for one set of identical in-line molds and a second parison configured for a second in-line mold or a second set of identical in-line molds.

It is still another object of the invention to provide a method for operating a blow molding apparatus comprising the steps of rotating a wheel having a plurality of in-line molds, extruding plastic material from a die into one of the plurality of in-line molds, detecting the proximity of a particular mold, and modifying the flow of plastic material extruded for the particular mold.

The above objects and other objects and features of the invention will be readily appreciated by one of ordinary skill in the art from the following detailed description of the preferred embodiment for carrying out the invention when taken in connection with the following drawings.

DETAILED DESCRIPTION OF THE PREFERRED EMBODIMENTS

Figure 1:
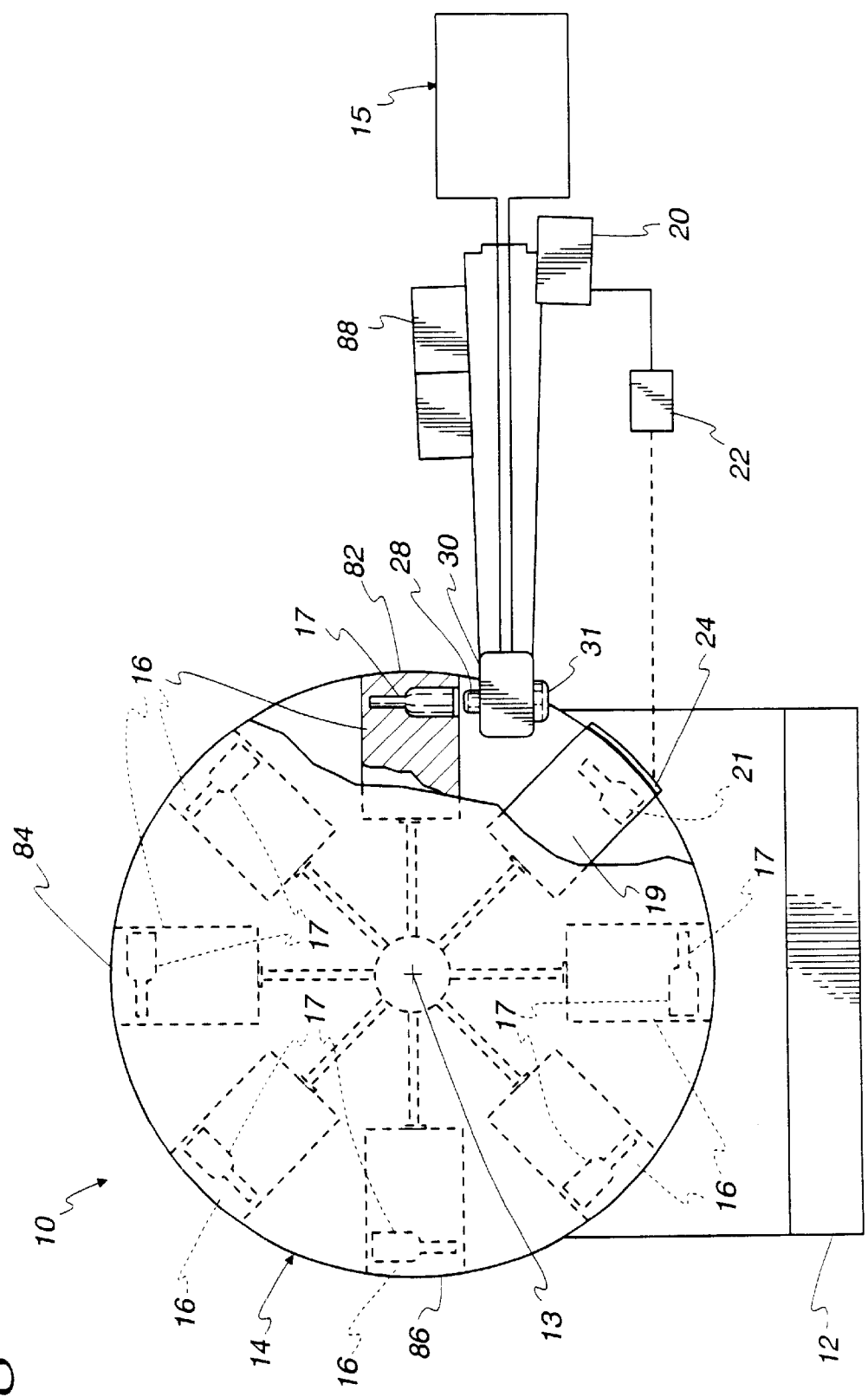
FIG. 1 is a side elevational view of a wheel type blow molding apparatus, according to the present invention.

FIG. 1 shows a blow molding machine 10 constructed in accordance with an embodiment of the present invention. The blow molding machine 10 rests on a base 12 and includes a rotatable wheel 14 and an extruder 15. The wheel 14 comprises a plurality of identical in-line molds 16, each mold 16 having an identical inner cavity 17. The wheel further comprises at least one short run in-line mold 19 having a short run inner cavity 21 different in shape and/or size from the plurality of identical inner cavities 17 of each identical in-line mold 16. The identical in-line molds 16 and the short run in-line mold 19, are mounted on wheel 14 preferably about the perimeter thereof, for rotation therewith about a rotational axis 13. The identical in-line molds 16 and the short run mold 19 each preferably have a pair of mold halves (not shown) that split the respective inner cavities 17, 21 and which open and close at various stations (described below) during rotation about the rotational axis 13 consistent with operation of a conventional wheel type blow molding apparatus.

The extruder 15 includes a die 30 located adjacent to the wheel 14 and defining a filling station 82 at which a series of hot plastic parisons are extruded from the die 30. The die 30 is positioned such that when the identical in-line molds 16 and the short run in-line mold 19 are rotated, seriatim, to the filling station 82 by the wheel 14, the hot plastic parisons extruded from the die 30 may be accepted into the respective inner cavities 17, 21 according to conventional wheel type blow moldings techniques. A trigger mechanism 88, synchronized to the rotation of the wheel 14, sends a signal to a controller 20 to timely trigger the extrusion of each successive parison for the respective in-line molds 16, 19.

In order to construct a proper bottle, a parison supplied by the die 30 will typically have a varying thickness profile along a length thereof to assure that upon the stretching experienced during blowing, the bottle will have the desired wall thickness at the various portions thereof. For example, it is often desirable to increase the thickness of a neck or bottom portion of a bottle relative to the remainder of the bottle to provide increased strength at those portions. Accordingly, the thickness of the parison for such a bottle may be, for example, relatively thicker at a top and bottom thereof corresponding to a neck and bottom portion of a bottle blown therefrom.

To facilitate the production of such a profile of a parison, a pin 28 of the die 30 controls the thickness of a wall of each parison extruded. The pin 28 is coupled to a hydraulic cylinder 31 by a drawbar (not shown) such that the hydraulic cylinder 31 may vary the position of the pin 28 during extrusion of a parison. As is known to one of ordinary skill in the art, the hydraulic cylinder 31 thus raises and lowers the pin 28 to vary the thickness of the parison as it is extruded. The controller 20 controls the hydraulic cylinder 31 and thus the positioning of the pin 28. The controller 20 has programmed therein, in a manner well-known to those skilled in the art, a preset pin control program or routine to control the vertical movement of the pin 28 during extrusion of each parison and manifests control of the pin 28 via the hydraulic cylinder 31 as is also known in the art. In this manner, the pin control program determines the thickness profile of the parison. The controller 20 also induces extrusion of the parison from the die 30 upon indication from the trigger mechanism 88 that a mold is in place and/or that a parison is required. In the preferred embodiment, the controller 20 is a "Smart Box 2000™" manufactured by Hunkar Laboratories, Inc., of Cincinnati, Ohio, and is programmed for simultaneous operation of two different pin control programs or routines. In this way two different types of parisons can be provided by the extruder 15.

In operation, a parison is extruded from the die 30 and the mold halves of one of the identical in-line molds 16 close around the parison such that the parison is received by the inner cavity 17. Thereafter, another parison is extruded from the die 30 and the mold halves of one of the short run in-line molds 19 close around the parison such that the parison is received by inner cavity 21. However, as described below, the parison extruded for the identical in-line molds 16 will differ from the parison extruded for the short run in-line mold 19 to account for the different shape and/or size of the respective cavities 17, 21.

Having received a parison within one of the identical inner cavities 17, the wheel 14, in a conventional manner, continues rotation to a blowing station 84 where air is introduced to the inner cavity 17 through a blow needle (not shown). The air from the blow needle expands the parison to conform to the shape and size of the inner cavity 17 and form a first container of a first design consistent with conventional blow molding techniques. The first container is subsequently cooled while in the inner cavity 17 and is thereafter released by opening the mold halves at a release station 86. Similarly, as the mold 19 arrives at the blowing station 84, air is introduced to the inner cavity 21 through the blow needle to form a second container of a second design consistent with conventional blow molding techniques. The second container is subsequently cooled while in the inner cavity 21 and thereafter released by opening the mold halves at the release station 86. From the foregoing it should be evident to one of ordinary skill in the art that each rotation of the preferred wheel 14, having a single short run mold 19, as described above and depicted in the figures, will thus produce a plurality of first containers and a single second container. Accordingly, continued operation of the wheel 14 will produce a plurality of first containers and a plurality of second containers, the ratio between which will conform to the ratio between the number of identical in-line molds 16 and the short run in-line mold 19 on the wheel 14. Therefore, the result of a single "run" of the wheel 14 of the present invention will produce a large number of first containers and a relatively smaller number of second containers (equivalent to a "short run" of second containers) which would otherwise be uneconomical to produce.

Figure 2:
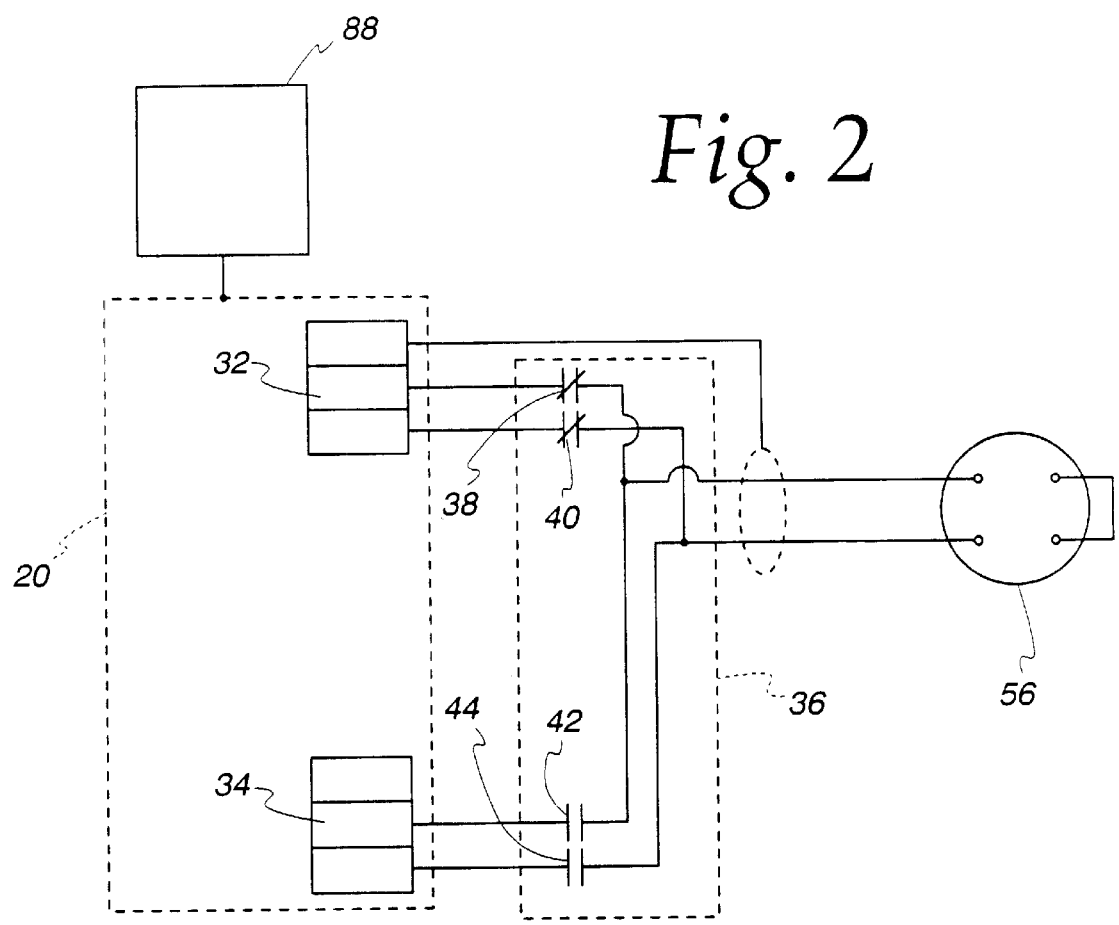
FIG. 2 is a schematic of the wiring of a controller, a relay and a servo valve according to the present invention.
Figure 3:
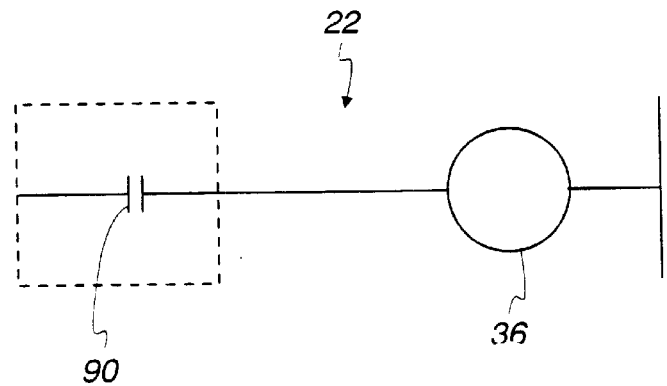
FIG. 3 is a schematic of a photo eye contact and a relay according to the present invention.

As discussed above, the parison required to produce the first container will usually differ from the parison required to produce the second container. To accomplish the extrusion of two different parison profiles for each revolution of the wheel 14, the preferred controller 20 (the "Smart Box 2000™" manufactured by Hunkar Laboratories, Inc.) has a first channel A 32 and a second channel B 34. The first channel A 32 defines a first pin control program for parisons to be extruded for the identical in-line molds 16. The second channel B 34 defines a second pin control program for parisons to be extruded for the short run in-line molds 19. In the preferred embodiment, a sensor 22 is connected to the controller 20. The sensor 22 comprises a position detector 90, such as a photo eye, and a relay 36. The relay 36 has normally closed contacts 38 and 40 and normally open contacts, 42 and 44 (described below) wired to a servo valve 56, as depicted in FIGS. 2 and 3, to facilitate switching back and forth between channel A 32 and channel B 34 on an in-line basis. Properly configured parisons are therefore provided to the identical molds 16 via the profile defined by channel A 32 and to the short run mold 19 via the profile defined by channel B 34.

Referring to FIGS. 2 and 3, the photo eye 90 is positioned adjacent wheel 14 and detects the presence of a metallic or reflective tape 24 on the outer periphery of the wheel 14 by light reflected therefrom. The tape 24 is positioned so that the photo eye 90 will signal when the short run mold 19 approaches the die 30. As can best be seen in FIG. 2, only one of channel A 32 or channel B 34 is connected in series with the servo valve 56 at any one time. Channel A 32 is the default channel, requiring contact 38 and contact 40 to be in a closed position when any of the identical in-line molds 16 approach the extrusion die 30. When the photo eye 90 detects the tape 24 on the wheel 14, relay 36 is energized, resulting in contacts 38 and 40 being opened, and contacts 42 and 44 being closed, thus connecting channel B 34 in series with the servo valve 56 and causing the pin 28 to move as defined by the second pin control program such that the parison extruded from the die 30 will conform with the requirements of the approaching short run mold 19. The relay 36 remains energized as long as the short run mold 19 is in position to receive the parison. This may be accomplished by selecting an appropriate length of tape 24, by using a second tape positioned to indicate that the relay 36 should be de-energized, by using a timer that energizes the relay 36 for a preset amount of time, or by other methods well known to those skilled in the art.

While the preferred embodiment utilizes a photo eye to detect metallic or reflective tape, it will be understood that other types of detecting mechanisms, such as limit or proximity switches and encoders, could be used without departing from the scope of the present invention. Conversely, a metallic or reflective tape may be placed about the periphery of the wheel 14 at all positions except adjacent to short run mold 19 and the controller 20 or sensor 22 configured to identify the short run mold 19 by the absence of tape. Other ways of conveying the proximity of the short run mold 19 to the sensor 22 which become apparent to one of ordinary skill in the art are within the scope of the present invention. Furthermore, it is contemplated that the trigger mechanism 88, which is synchronized to the rotation of the wheel 14, may be programmed to trigger the relay 36 to switch from channel A 32 to channel B 34 upon the approach of the short run mold 19. For example, when the wheel comprises total of eight molds 16, 19, as depicted in FIG. 1, the trigger mechanism would be configured to trigger the relay 36 after triggering the production of seven parisons. The position defector such as the photo eye 90 could thus be eliminated from the sensor 22 of the present invention.

As each of the identical in-line molds 16 rotate to the extrusion die 30, the trigger mechanism 88 indicates that a parison is required and the controller 20 activates the pin control program defined by channel A 32. Subsequently, and prior to the trigger mechanism 88 indicating that a parison is required for the short run mold 19, the photo eye 90, detects the tape 24 on the outer edge of the wheel 14 as the short run mold 19 approaches the die 30 and the photo eye 90 triggers relay 36. Relay 36 disconnects the servo valve 56 from channel A 32 of the controller and connects it to channel B 34. The appropriate parison is then extruded for mold 19 upon the trigger mechanism 88 inducing extrusion thereof. The switch from channel A 32 to channel B 34 occurs after extrusion of the parison to the identical mold 16, but prior to the trigger mechanism 88 triggering the extrusion of a parison for the short run mold 19.

In operation, the blow-molding machine 10 of the present invention rotates the wheel 14 and thereby circulates the plurality of identical in-line molds 16 and the short run in-line mold 19 between the stations 82, 84, 86. As each of the molds 16, 19 approaches the die 30, seriatim, the trigger mechanism 88 signals the controller 20 to cause the extrusion of a parison from the die 30. If the mold approaching the die 30 is one of the identical in-line molds 16, the controller will remain at the default program defined by channel A 32 and hydraulic cylinder 31 will cause the parameters of the parison to comply with those required to mold a proper first container. Alternatively, if the mold approaching the die 30 is the short run mold 19, the sensor 22 will sense the tape 24 and the controller 20 will switch to channel B 34 prior to the trigger mechanism 88 signaling the controller 20 to cause the extrusion of a parison. Therefore, when the trigger mechanism 88 does signal the controller 20 to cause the extrusion of a parison, the hydraulic cylinder 31 causes the pin 28 to extrude the parison according to the parameters required to mold a proper second (short run) container. The controller 20 then switches back to channel A 32 after a parison is received by the short run mold 19. Upon extrusion of the parison having the appropriate parameters for the associated mold 16 or 19, the mold halves of that associated mold 16 or 19 will close on the parison consistent with conventional wheel type blow molding techniques. The mold 16 or 19 then continues to the blowing station 84 where the blow needle introduces air into the mold cavity 17 or 21 to form a container and the container is cooled in the mold 16 or 19 until it reaches the release station 86 where the mold halves open thus releasing the container from the wheel 14. The mold 16 or 19 then continues back toward the die 30 to repeat the cycle.

While the embodiment described above comprises only a single short run mold 19 and the remaining molds on the wheel 14 comprise identical in-line molds 16, it is recognized that the wheel 14 could comprise a plurality of short run molds 19 either adjacent to one another, or interspersed among the identical in-line molds 16. It is contemplated, however, that configuring the wheel 14 such that each of a plurality of short run molds 19 are adjacent to each other will require less switching between channel A 32 and channel B 34 resulting in less wear to the machine 10. Required maintenance for the blow-molding machine 10 of the present invention is thereby minimized. With the plurality of short run molds 19 thus arranged, each short run mold 19 would have a tape 24 placed near or adjacent thereto on the outer periphery of the wheel 14 to facilitate the switch of the controller 20 to channel B 34 at the approach of each short run mold 19. Alternatively, a single piece of tape 24 would be placed adjacent to the first of the plurality of short run molds 19 causing the controller 20 to switch to channel B 34 and the controller 20 would be configured to remain on channel B 34 until a second piece of tape (not shown) is recognized by sensor 22 at which time the controller 20 would switch back to channel A 32 and remain on channel A 32 until the piece of tape 24 returns causing the controller to switch back to channel B 34. A timer connected to the relay 36 could also be used to define the number of parisons extruded according to channel B 34.

In another embodiment of the present invention 10, the controller 20 could comprise a single channel having two parison routines. Thusly configured, one of the two routines would run each time that a parison is requested. If the controller 20 does not receive an indication from the position detector that the short run mold 19 is adjacent to the die 30, then a first pin profile routine would be delivered to the servo valve 56 to cause the extrusion of a parison required for one of the identical molds 16. If the controller 20 does receive an indication from the position detector that the short run mold 19 is adjacent to the die 30, then a second pin profile routine would be delivered to the servo valve 56 to cause the extrusion of a parison required for the short run mold 19.

In yet another embodiment, the wheel 14 may comprise only identical molds 16 such that each mold 16 about the wheel is identical to each other mold 16. The parison defined by channel B 34 would necessarily, therefore, be provided to a mold 16 identical to the molds 16 into which the parison defined by channel A 32 is provided. However, the variations in the parisons could be employed to effect changes in the final bottle configuration. For example, when channel B 34 causes a thicker parison to be supplied than channel A 32, the resulting bottle will look nearly identical, but will have thicker walls to provide, for example, greater strength. Other parameter variations will become apparent to one of ordinary skill in the art and fall within the scope of the present invention.

It is understood, of course, that the form of the invention shown and described herein is not intended to illustrate all possible forms thereof. For example, other parison parameters, such as width, or any combinations thereof, could be varied from channel A 32 to channel B 34. Moreover, while the above describes a machine for molding bottles, other objects may also be manufactured with the present invention as is known in the art. Modifications may be made to the embodiments described herein without departing from the scope of the present invention. It will also be understood that the words used herein are words of description rather than limitation, and that various changes may be made without departing from the spirit and scope of the invention as disclosed.

I claim:

1. A blow molding apparatus comprising:
   a parison extruder; and
   a wheel configured to rotate about a rotational axis, the wheel comprising a plurality of substantially identical molds and at least one mold differing from the plurality of substantially identical molds, the plurality of substantially identical molds and the at least one differing mold being disposed around the rotational axis of the wheel;
   the parison extruder positioned adjacent to the wheel and configured to supply parisons to both the plurality of substantially identical molds and the at least one differing mold during in-line molding.

2. The blow molding apparatus of claim 1 further comprising a position detector positioned adjacent to the wheel for detecting the presence or absence of the at least one differing mold.

3. The blow molding apparatus of claim 2 further comprising a controller responsive to the position detector, the controller configured to execute a first parison parameter routine when the at least one differing mold is not detected by the position detector and a second parison parameter routine when the at least one mold is detected by the position detector.

4. The blow molding apparatus of claim 3, the parison extruder producing a first parison when the controller executes the first parison parameter routine and producing a second parison when the controller executes the second parison parameter routine, the second parison differing from the first parison in at least one of thickness and length.

5. The blow molding apparatus of claim 1, the parison extruder being configured to supply a first parison to be accommodated by the plurality of substantially identical molds and a second parison to be accommodated by the at least one differing mold, the at least one differing mold differing from the plurality of identical molds in at least one of size and shape.

6. The blow molding apparatus of claim 5, the second parison differing from the first parison in at least one of thickness and length.

7. The blow molding apparatus of claim 1, the parison extruder comprising an extrusion die and a pin operatively connected to the extrusion die.

8. A blow molding apparatus comprising:
   a parison extruder; and
   a wheel configured to rotate about a rotational axis, the wheel comprising a plurality of substantially identical molds and at least one mold differing from the plurality of substantially identical molds, the plurality of substantially identical molds and the at least one differing mold being disposed around the rotational axis of the wheel for in-line molding,
   the parison extruder positioned adjacent to the wheel for supplying a first parison and a second parison differing from the first parison in at least one of thickness and length to the molds disposed about the wheel.

9. The blow molding apparatus of claim 8 further comprising a position detector positioned adjacent to the wheel for detecting the presence or absence of the at least one differing mold.

10. The blow molding apparatus of claim 9 further comprising a controller responsive to the position detector, the controller configured to execute a first parison parameter routine when the at least one differing mold is not detected by the position detector and a second parison parameter routine when the at least one mold is detected by the position detector.

11. The blow molding apparatus of claim 10, the parison extruder producing the first parison when the controller executes the first parison parameter routine and producing the second parison when the controller executes the second parison parameter routine.

12. The blow molding apparatus of claim 8, the parison extruder being configured to supply the first parison to be accommodated by the plurality of substantially identical molds and the second parison to be accommodated by the at least one differing mold, the at least one differing mold differing from the plurality of identical molds in at least one of size and shape.

13. The blow molding apparatus of claim 11, the parison extruder comprising an extrusion die and a pin operatively connected to the controller.

14. A blow molding apparatus comprising:
    a parison extruder;
    a wheel configured to rotate about a rotational axis, the wheel comprising a plurality of substantially identical molds and at least one mold differing from the plurality of substantially identical molds, the plurality of substantially identical molds and the at least one differing mold being disposed around the rotational axis of the wheel for in-line molding; and
    a controller operatively associated with the parison extruder and defining a plurality of parison parameter routines comprising a first parison parameter routine associated with the plurality of substantially identical molds and a second parison parameter routine associated with the at least one differing mold, the controller facilitating switching between defining the first parison parameter routine and the second parison parameter routine during in-line molding.

15. The blow molding apparatus of claim 14 further comprising a position detector positioned adjacent to the wheel for detecting the presence or absence of the at least one differing mold.

16. The blow molding apparatus of claim 15 the controller being responsive to the position detector, the controller configured to execute the first parison parameter routine when the at least one differing mold is not detected by the position detector and the second parison parameter routine when the at least one mold is detected by the position detector.

17. The blow molding apparatus of claim 16, the parison extruder producing a first parison when the controller executes the first parison parameter routine and producing a second parison when the controller executes the second parison parameter routine, the second parison differing from the first parison in at least one of thickness and length.

18. The blow molding apparatus of claim 16, the parison extruder being configured to supply a first parison to be accommodated by the plurality of substantially identical molds and a second parison to be accommodated by the at least one differing mold, the at least one differing mold differing from the plurality of identical molds in at least one of size and shape.

19. The blow molding apparatus of claim 18, the second parison differing from the first parison in at least one of thickness and length.

20. The blow molding apparatus of claim 14, the parison extruder comprising an extrusion die and a pin operatively connected to the controller.

21. A blow molding apparatus comprising:

a parison extruder; and a wheel configured to rotate about a rotational axis, the wheel comprising a plurality of substantially identical mold cavities and at least one mold cavity differing from the plurality of substantially identical mold cavities, the plurality of substantially identical mold cavities and the at least one differing mold cavity being disposed around the rotational axis of the wheel;

the parison extruder positioned adjacent to the wheel and configured to supply parisons, during each rotation of the wheel, to both the plurality of substantially identical mold cavities and the at least one differing mold cavity.

22. The blow molding apparatus of claim 21 further comprising a position detector positioned adjacent to the wheel for detecting the presence or absence of the at least one differing mold cavity.

23. The blow molding apparatus of claim 22 further comprising a controller responsive to the position detector, the controller configured to execute a first parison parameter routine when the at least one differing mold cavity is not detected by the position detector and a second parison parameter routine when the at least one mold cavity is detected by the position detector.

24. The blow molding apparatus of claim 23, the parison extruder producing a first parison when the controller executes the first parison parameter routine and producing a second parison when the controller executes the second parison parameter routine, the second parison differing from the first parison in at least one of thickness and length.

25. The blow molding apparatus of claim 21, the parison extruder being configured to supply a first parison to be accommodated by the plurality of substantially identical mold cavities and a second parison to be accommodated by the at least one differing mold cavity, the at least one differing mold cavity differing from the plurality of identical mold cavities in at least one of size and shape.

26. The blow molding apparatus of claim 25, the second parison differing from the first parison in at least one of thickness and length.

27. The blow molding apparatus of claim 21, the parison extruder comprising an extrusion die and a pin operatively connected to the extrusion die.

28. A blow molding apparatus comprising:

a parison extruder; and a wheel configured to rotate about a rotational axis, the wheel comprising a plurality of substantially identical mold cavities and at least one mold cavity differing from the plurality of substantially identical mold cavities, the plurality of substantially identical mold cavities and the at least one differing mold cavity being disposed around the rotational axis of the wheel, the parison extruder positioned adjacent to the wheel for supplying, during each rotation of the wheel, a first parison and a second parison differing from the first parison in at least one of thickness and length to the mold cavities disposed about the wheel.

29. The blow molding apparatus of claim 28 further comprising a position detector positioned adjacent to the wheel for detecting the presence or absence of the at least one differing mold cavity.

30. The blow molding apparatus of claim 29 further comprising a controller responsive to the position detector, the controller configured to execute a first parison parameter routine when the at least one differing mold cavity is not detected by the position detector and a second parison parameter routine when the at least one mold cavity is detected by the position detector.

31. The blow molding apparatus of claim 30, the parison extruder producing the first parison when the controller executes the first parison parameter routine and producing the second parison when the controller executes the second parison parameter routine.

32. The blow molding apparatus of claim 28, the parison extruder being configured to supply the first parison to be accommodated by the plurality of substantially identical mold cavities and the second parison to be accommodated by the at least one differing mold cavity, the at least one differing mold cavity differing from the plurality of identical mold cavities in at least one of size and shape.

33. The blow molding apparatus of claim 31, the parison extruder comprising an extrusion die and a pin operatively connected to the controller.

34. A blow molding apparatus comprising:

a parison extruder;

a wheel configured to rotate about a rotational axis, the wheel comprising a plurality of substantially identical mold cavities and at least one mold cavity differing from the plurality of substantially identical mold cavities, the plurality of substantially identical mold cavities and the at least one differing mold cavity being disposed around the rotational axis of the wheel; and a controller operatively associated with the parison extruder and defining, during each rotation of the wheel, a plurality of parison parameter routines comprising a first parison parameter routine associated with the plurality of substantially identical mold cavities and a second parison parameter routine associated with the at least one differing mold cavity.

35. The blow molding apparatus of claim 34 further comprising a position detector positioned adjacent to the wheel for detecting the presence or absence of the at least one differing mold cavity.

36. The blow molding apparatus of claim 35 the controller being responsive to the position detector, the controller configured to execute the first parison parameter routine when the at least one differing mold cavity is not detected by the position detector and the second parison parameter routine when the at least one mold cavity is detected by the position detector.

37. The blow molding apparatus of claim 36, the parison extruder producing a first parison when the controller executes the first parison parameter routine and producing a second parison when the controller executes the second parison parameter routine, the second parison differing from the first parison in at least one of thickness and length.

38. The blow molding apparatus of claim 36, the parison extruder being configured to supply a first parison to be accommodated by the plurality of substantially identical mold cavities and a second parison to be accommodated by the at least one differing mold cavity, the at least one differing mold cavity differing from the plurality of identical mold cavities in at least one of size and shape.

39. The blow molding apparatus of claim 38, the second parison differing from the first parison in at least one of thickness and length.

40. The blow molding apparatus of claim 34, the parison extruder comprising an extrusion die and a pin operatively connected to the controller.

* * * * *